(12) United States Patent
Santamaria

(10) Patent No.: US 7,681,894 B2
(45) Date of Patent: Mar. 23, 2010

(54) DEVICE FOR FITTING SEATS AND THE LIKE TO THE CHASSIS OF BABY CARRIAGES

(75) Inventor: Manuel Jane Santamaria, Barcelona (ES)

(73) Assignee: Jane, S.A., Barcelona (ES)

( * ) Notice: Subject to any disclaimer, the term of this patent is extended or adjusted under 35 U.S.C. 154(b) by 403 days.

(21) Appl. No.: 11/702,862

(22) Filed: Feb. 6, 2007

(65) Prior Publication Data

US 2007/0187914 A1 Aug. 16, 2007

(30) Foreign Application Priority Data

Feb. 14, 2006 (ES) .............................. 200600317 U

(51) Int. Cl.
*B62B 7/14* (2006.01)
(52) U.S. Cl. .............. 280/47.38; 280/47.39; 280/47.34; 280/647; 24/DIG. 51; 24/DIG. 52; 24/589.1; 24/593.1; 24/607; 24/633; 24/640; 24/656; 24/664
(58) Field of Classification Search .............. 280/47.38, 280/47.39, 47.34, 30, 648, 647, 638, 639; 297/130; 24/31 B, 302, 604, 605, 606, 607, 24/587.12, 589.1, 593.1, 595.1, 633, 639, 24/640, 642, 656, 664
See application file for complete search history.

(56) References Cited

U.S. PATENT DOCUMENTS

| 3,145,442 | A | * | 8/1964 | Brown ........................ 24/639 |
| 5,865,447 | A | | 2/1999 | Huang |
| 5,947,555 | A | * | 9/1999 | Welsh et al. ................. 297/130 |
| 6,446,314 | B1 | * | 9/2002 | Anscher ....................... 24/614 |
| 7,032,922 | B1 | * | 4/2006 | Lan ............................. 280/648 |
| 2004/0164593 | A1 | | 8/2004 | Santamaria |

FOREIGN PATENT DOCUMENTS

DE 20 2005 008 211 10/2005
FR 2 774 647 8/1999

* cited by examiner

*Primary Examiner*—Paul N Dickson
*Assistant Examiner*—Bryan A Evans
(74) *Attorney, Agent, or Firm*—Jordan and Hamburg LLP

(57) ABSTRACT

A device for fitting seats and the like to the chassis of baby carriages includes at each side of the seat a respective anchoring mechanism for a direct anchoring at corresponding attachments provided at the chassis of the baby carriage. The anchoring mechanism is housed in a body inferiorly having a projection having a slanted edge adapted to shift a transverse pin slidably fitted in a box making up the attachment provided at the chassis when the aforementioned body is fitted to the box. The transverse pin is linked to a spring adapted to take said transverse pin back to its initial position when the action of the aforementioned projection having a slanted edge has ceased. A control is exteriorly fitted to the body housing the anchoring mechanism, the control being linked to said mechanism and when actuated releasing the anchored state.

1 Claim, 2 Drawing Sheets

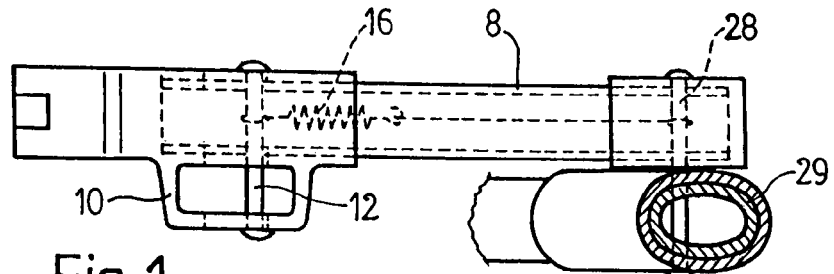
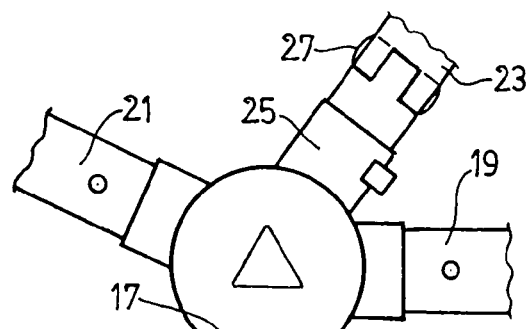
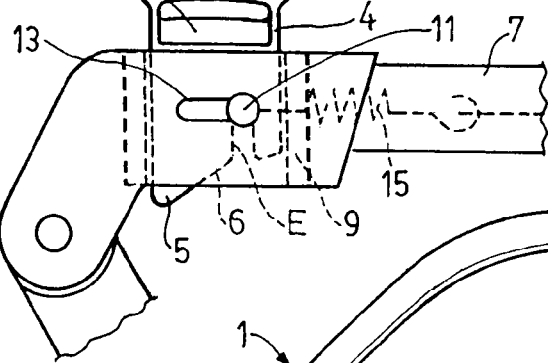
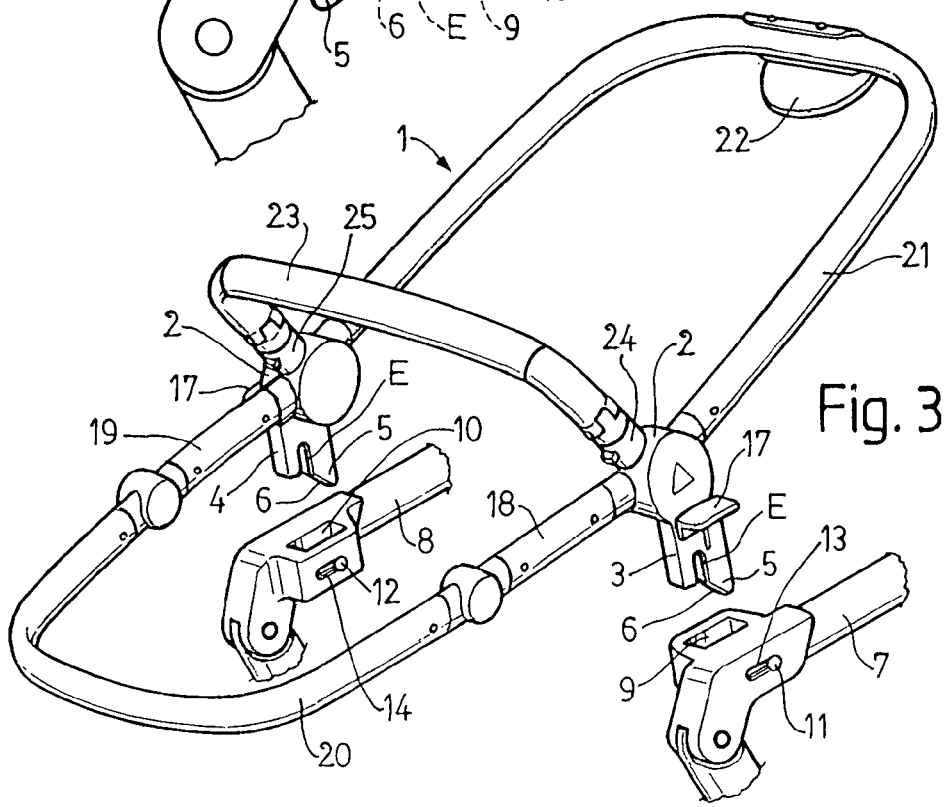

DEVICE FOR FITTING SEATS AND THE LIKE TO THE CHASSIS OF BABY CARRIAGES

BACKGROUND OF THE INVENTION

A device for fitting seats and the like to the chassis of baby carriages.

There exist several devices for fitting seats, carrycots and the like to the chassis of baby carriages in order to arrange in these latter the carrycot when the child is very small and to later on arrange the seat when the child has already grown to a bigger size, said devices being each adapted to be removably fitted to a respective holder being provided at each side of the chassis.

From among those of this kind of devices those are known which comprise an anchoring mechanism allowing to carry out a direct anchoring at the transverse pin being provided in a box being integral with each side of the chassis, the seat or the like being fitted thereby being thus arranged in one only sense, i.e. generally facing the rear side of the baby carriage, this latter side being the one being pushed by the person moving the baby carriage about.

SUMMARY OF THE INVENTION

It is the object of this invention to improve this kind of devices in order to in a quick, practical and simple way have the seat or the like removably fitted in such an arrangement that it faces the rear side of the baby carriage or the front side of this latter, i.e. the forward moving direction.

A characterizing feature for such a purpose lies in the fact that the anchoring mechanism is housed in a body inferiorly having a projection having a slanted edge being fit to shift the transverse pin being slidably fitted in the box when the aforementioned body is fitted to said box.

Another characterizing feature lies in the fact that the transverse pin is linked to a spring being fit to take said transverse pin back to its initial position when the action of the aforementioned projection having a slanted edge has ceased.

An also characterizing feature lies in the fact that a control is exteriorly fitted to the actual body housing the anchoring mechanism, said control being linked to said mechanism and when being actuated bringing about an unlocking action causing the release of the anchored state in order to thus be in a position to remove the seat or the like.

These and other characterizing features will be best made apparent by the following detailed description whose understanding will be made easier by the accompanying two sheets of drawings showing a practical embodiment being cited only by way of example not limiting the scope of the present invention.

BRIEF DESCRIPTION OF THE DRAWINGS

FIG. 1 shows in a plan-view the detail of the box with the shiftable transverse pin;

FIG. 2 illustrates in a side elevation the detail of the device having been lockedly engaged for a positioning of the seat as per a sitting position facing the rear side of the baby carriage;

FIG. 3 depicts in a perspective view the seat frame facing the forward moving direction before being fitted to the chassis of the baby carriage;

DETAILED DESCRIPTION OF THE INVENTION

Figure 4:
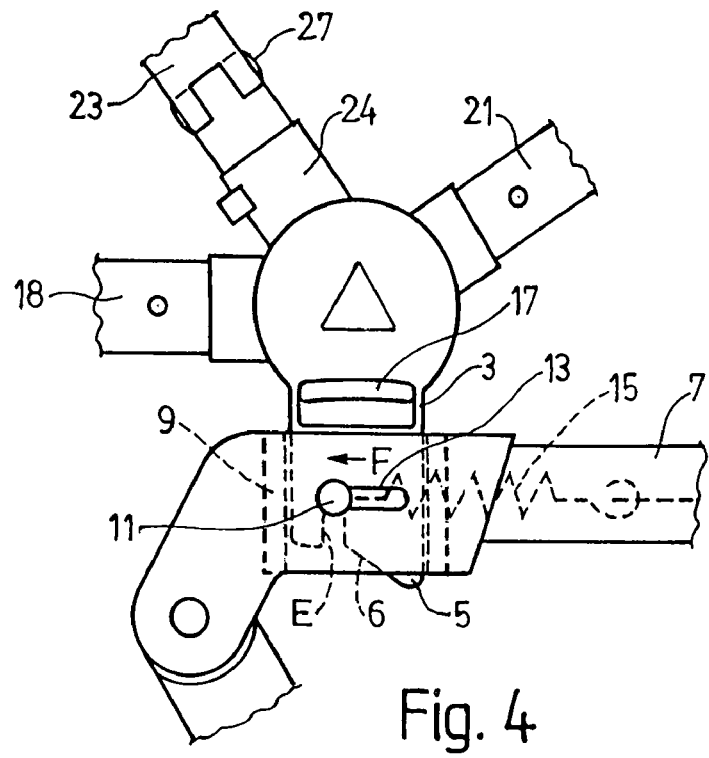
FIG. 4 is a side elevational view of the device having been lockedly engaged as per the position of FIG. 3.
Figure 5:
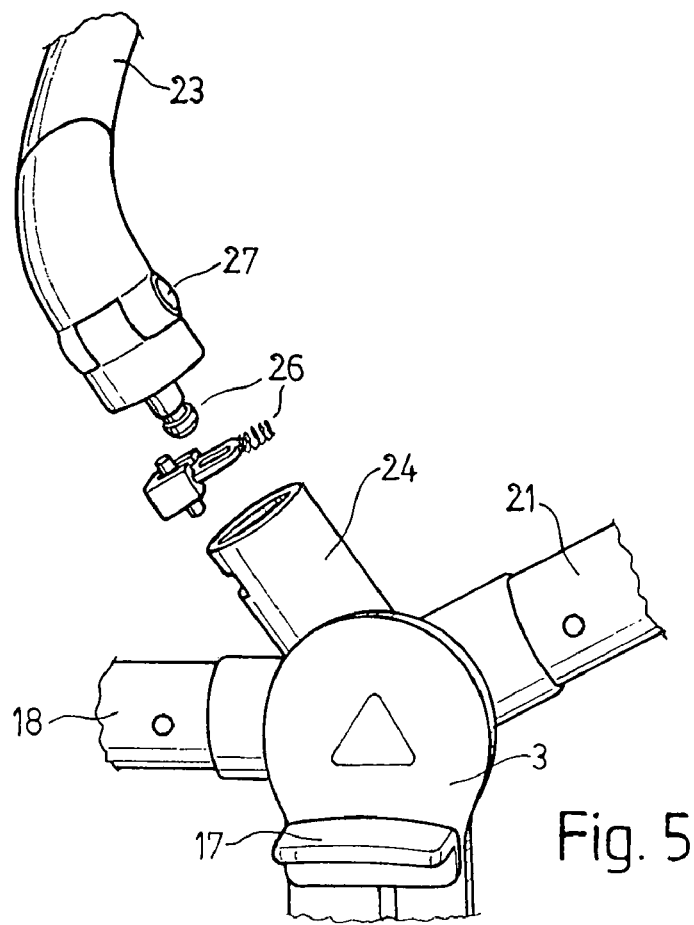
FIG. 5 shows in a perspective view the detail of the fitting of a handrail to the seat.

According to the drawings this device for fitting seats and the like to the chassis of baby carriages comprises at each side of the seat frame (1), concretely at a central hub (2), a respective conventional anchoring mechanism being housed in a respective body (3) and (4) inferiorly having a projection (5) having a slanted edge (6).

A respective box (9) and (10) is fitted to each of the armrests (7) and (8) and has a respective transverse pin (11) and (12) fitted to it in a sliding arrangement in corresponding horizontal slots (13) and (14) being provided in said boxes.

Said transverse pins (11) and (12) are each linked to a respective spring (15) and (16) being at its free end securely attached to the pin (28) where the armrests (7) and (8) are linked in a pin-jointed connection to the corresponding branches (29) of the handlebar of the baby carriage.

The anchoring mechanisms (not shown) are already known and comprise a catch being located at the vertical notch (E) being provided in the bodies (3) and (4), said catch being fit to engagedly seize the transverse pins (11) and (12), said notch being arranged in an offset arrangement and thus determining two portions of different width.

In this case the lower projection (5) corresponds to the wider portion, and when placing the seat in its normal position facing the rear side (FIG. 2) the anchoring mechanism in a direct manner engagedly seizes the pins (11) and (12).

When wishing to fit the seat facing the forward moving direction (FIGS. 3 and 4) the lower projection (5) abuttingly bumps against the aforementioned transverse pins (11) and (12), and thanks to the slanted edge (6) said pins are shifted as per arrow (F) till being put in register with the notches (E), the catch of the anchoring mechanism then carrying out its catching action in said position.

When releasing the seat the pins (11) and (12) are made to regain their initial position by virtue of the returning force of the springs (15) and (16).

The locked engagement of the anchoring mechanism is brought about in an automatic manner, and in order to be released said anchoring mechanism is linked to an outer control (17) which when being manually actuated in an upward direction releases it from the pins (11) and (12), said control being biased towards the active position of the anchoring mechanism by virtue of the biasing action of a spring being installed inside the bodies (3) and (4).

The seat frame comprises two lateral lengths (18) and (19) being fitted to the hubs (2) and having articulately fitted to their ends a U-shaped member (20) for forming a legrest, and a U-shaped member (21) for forming the backrest, this latter being fitted in an articulated arrangement and being thus in a position to assume different inclined positions that are to be stabilized with a control (22) by using means being already known.

A handrail (23) is linked to the hubs (2) and is fit to have each of its ends removably fitted to a respective tubular trunnion (24) and (25) being integral with said hubs, for said fitting means (26) having been provided which are fit to act as a by way of ball joint in order to allow the handrail (23) being fitted at one of its ends to effect a turning motion, each of the handrail ends besides comprising an articulated link (27).

The invention claimed is:

1. A device for fixing a seat to a chassis of a baby carriage comprising a combination of first and second anchoring mechanisms disposed on opposing sides of the seat and corresponding first and second chassis attachments on the chassis for receiving the corresponding anchoring mechanisms;

the chassis attachments having box-shaped openings for receiving the corresponding anchoring mechanisms and, within in the box-shaped openings, transverse pins attached in and extending across the box-shaped openings;

the anchoring mechanisms having an elongated latch body in the shape of a rectangular solid that has opposed wide side faces and opposed edge faces that are narrower than the side faces and seat-proximal and seat-distal ends, the body extending inferiorly in its longest dimension, the anchoring mechanisms further having a vertical notch formed in the wide faces of the latch body, the notches open at the seat-distal ends and extending towards the seat proximal ends, the notches terminating at a latch mechanism; wherein:

on the chassis attachments, transverse slots are formed in which the transverse pins are slidably arranged and biased towards an initial position by springs attached to the transverse pins, and on the latch bodies of the anchoring mechanisms, the vertical notches being disposed asymmetrically with respect to the side faces and a portion of the edge surfaces at the seat-distal ends of the latch bodies formed to define a slanted portion at the seat-distal ends.

* * * * *